(12) United States Patent
Li et al.

(10) Patent No.: US 9,158,073 B2
(45) Date of Patent: Oct. 13, 2015

(54) OPTICAL FIBER CONNECTOR

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Zhi-Ming Li, Shenzhen (CN); Le-Peng Wei, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 99 days.

(21) Appl. No.: 13/792,223

(22) Filed: Mar. 11, 2013

(65) Prior Publication Data

US 2013/0266267 A1    Oct. 10, 2013

(30) Foreign Application Priority Data

Apr. 9, 2012   (CN) .......................... 201210100959.3

(51) Int. Cl.
*G02B 6/36* (2006.01)
*G02B 6/255* (2006.01)
*G02B 6/38* (2006.01)

(52) U.S. Cl.
CPC ............... *G02B 6/36* (2013.01); *G02B 6/2552* (2013.01); *G02B 6/3858* (2013.01); *G02B 6/3869* (2013.01); *G02B 6/3823* (2013.01); *G02B 6/3887* (2013.01); *G02B 6/3898* (2013.01)

(58) Field of Classification Search
CPC ...... G02B 6/36; G02B 6/3855; G02B 6/3869; G02B 6/12; G02B 6/122; G02B 6/1223; G02B 6/125; G02B 6/2552; G02B 6/3823; G02B 6/3858; G02B 6/3887; G02B 6/3898
USPC .................... 385/78, 83, 39, 58, 72, 123, 139
See application file for complete search history.

(56) References Cited

U.S. PATENT DOCUMENTS

2007/0122091 A1*  5/2007  Kobayashi .................... 385/104

FOREIGN PATENT DOCUMENTS

| CN | 201955497 U | 8/2011 | |
|---|---|---|---|
| JP | 2001-249251 A | 9/2001 | |
| JP | 2002-72011 A | 3/2002 | |
| JP | 2005107309 A | 4/2005 | |
| JP | 2009192908 A | 8/2009 | |
| JP | 2010134100 A | 6/2010 | |
| JP | 2012014159 A | 1/2012 | |
| JP | 2012-37624 A | 2/2012 | |
| WO | WO 2010/118106 | * 10/2010 | ............. C03B 37/16 |

* cited by examiner

*Primary Examiner* — Akm Enayet Ullah
*Assistant Examiner* — Michael Mooney
(74) *Attorney, Agent, or Firm* — Novak Druce Connolly Bove + Quigg LLP

(57) ABSTRACT

An optical fiber connector includes a fixing module, an optical fiber ferrule positioned at an end of the fixing module, and an optical fiber gripped in the fixing module. The optical fiber ferrule axially defines a through hole. An end surface of the optical fiber includes an arc surface. The optical fiber is received in the through hole of the optical ferrule.

17 Claims, 11 Drawing Sheets

OPTICAL FIBER CONNECTOR

CROSS-REFERENCE TO RELATED APPLICATIONS

This application claims all benefits accruing under 35 U.S.C. §119 from China Patent Application No. 201210100959.3, filed on Apr. 9, 2012, in the China Intellectual Property Office, the disclosure of which is incorporated herein by reference. The application is also related to co-pending applications entitled, "OPTICAL FIBER CONNECTOR AND ASSEMBLING DEVICE FOR THE SAME" Ser. No. 13/792,215; "FIBER END SURFACE MACHINING DEVICE AND FIBER POSITION STRUCTURE THEREOF" Ser. No. 13/792,218; "FIBER MACHINING DEVICE AND ASSEMBLING METHOD FOR OPTICAL FIBER CONNECTOR" Ser. No. 13/792,219; "OPTICAL FIBER CONNECTOR" Ser. No. 13/792,221; "OPTICAL FIBER CONNECTOR" Ser. No. 13/792,222; "OPTICAL FIBER CLAMPING MECHANISM AND OPTICAL FIBER CONNECTOR USING THE SAME" Ser. No. 13/792,229.

BACKGROUND

1. Technical Field

The present disclosure relates to connectors, particularly to an optical fiber connector.

2. Description of the Related Art

Fiber To The Home (FTTH) is widely used in communications field, and many optical fiber connectors are needed for connecting the optical fiber. An optical fiber connector generally includes an optical ferrule with an optical fiber stub already terminated in the optical ferrule, an optical fiber holder, and a clamp sleeve sleeved on the optical fiber holder to fasten a field optical fiber. In order to improve the quality of optical coupling and minimize Fresnel losses of the optical fiber connector, there are two manners of treating a joint between the optical fiber stub and the field optical fiber. In a first manner, a matching liquid is injected in the optical fiber holder. However, the matching liquid evaporates easily. In a second manner, the optical fiber stub and the field optical fiber are joined together by melting them together. However, it is not convenient or precise to exactly join the optical fiber stub and the field optical fiber together.

Therefore, there is room for improvement within the art.

BRIEF DESCRIPTION OF THE DRAWING

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
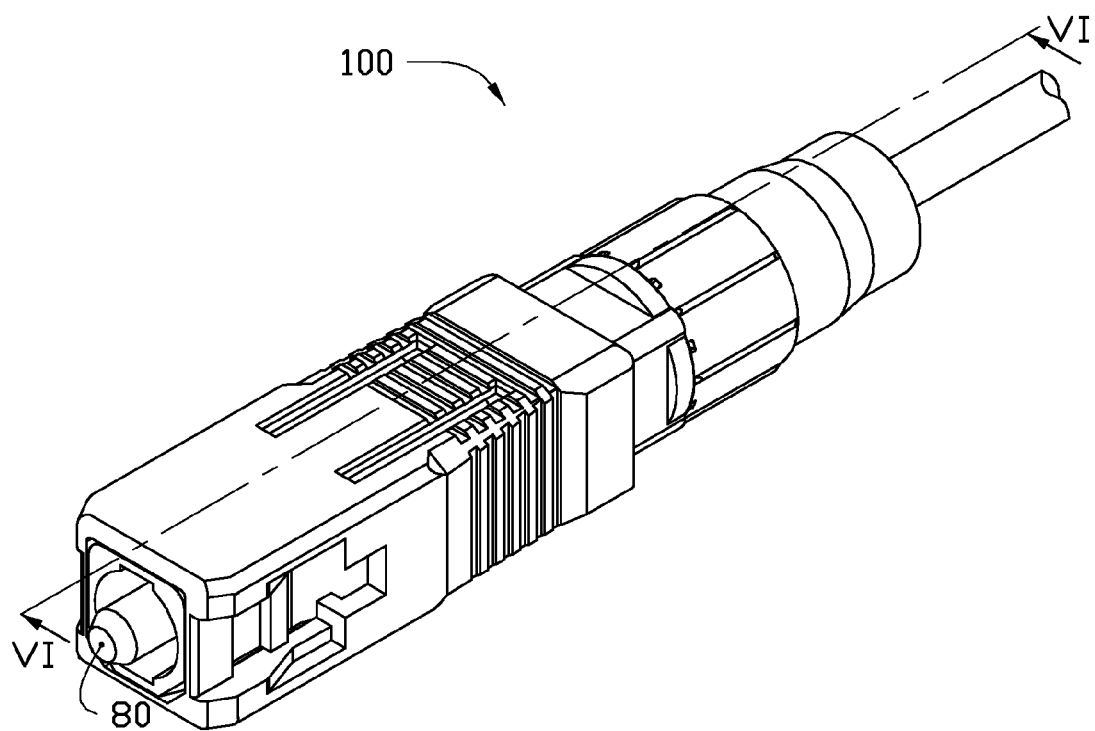
FIG. 1 is an isometric, assembled view of an embodiment of an optical fiber connector.
Figure 2:
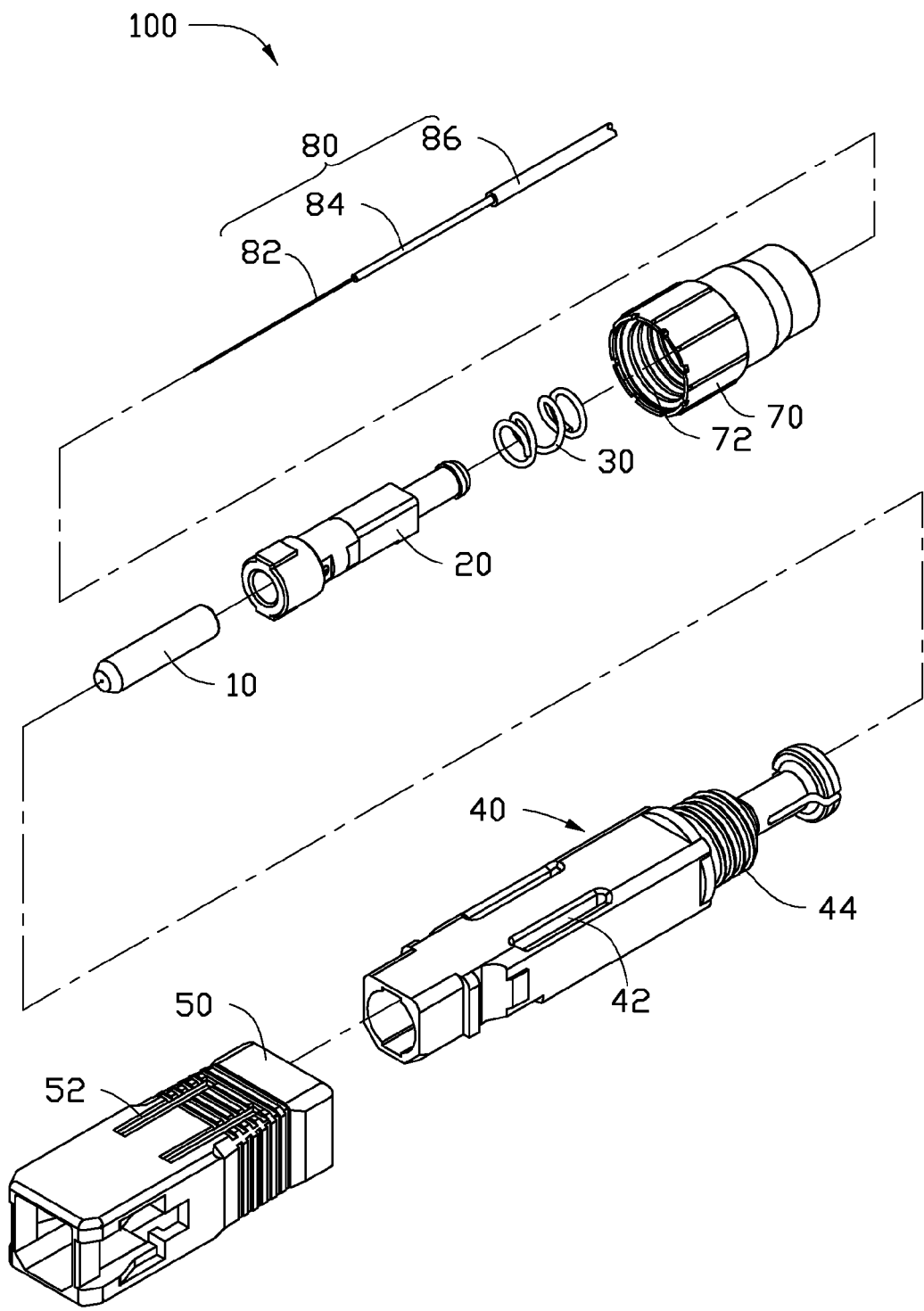
FIG. 2 is an exploded, isometric view of the optical fiber connector of FIG. 1 including a fixing module.

FIGS. 1 and 2 show an embodiment of an optical fiber connector 100. The optical fiber connector 100 includes an optical fiber ferrule 10, a fixing module 20, an elastic member 30, an inner housing 40, an outer housing 50, and a boot 70. The optical fiber ferrule 10 is positioned on one end of the fixing module 20. The elastic member 30 is sleeved on the other end of the fixing module 20 away from the optical fiber ferrule 10. The inner housing 40 is sleeved on the fixing module 20. The outer housing 50 is sleeved on the inner housing 40. The boot 70 is sleeved on an end of the inner housing 40 away from the outer housing 50. In an illustrated embodiment, the optical fiber connector 100 is a Subscriber Connector (SC) optical fiber connector. The optical fiber connector 100 grips a cable 80. The cable 80 includes an optical fiber 82, an inner coating 84 formed on the optical fiber 82, and an outer coating 86 formed on the inner coating 84. In order to facilitate the cable 80 being gripped in the optical fiber connector 100, part of the outer coating 86 and the inner coating 84 are removed for exposing the optical fiber 82.

Figure 3:
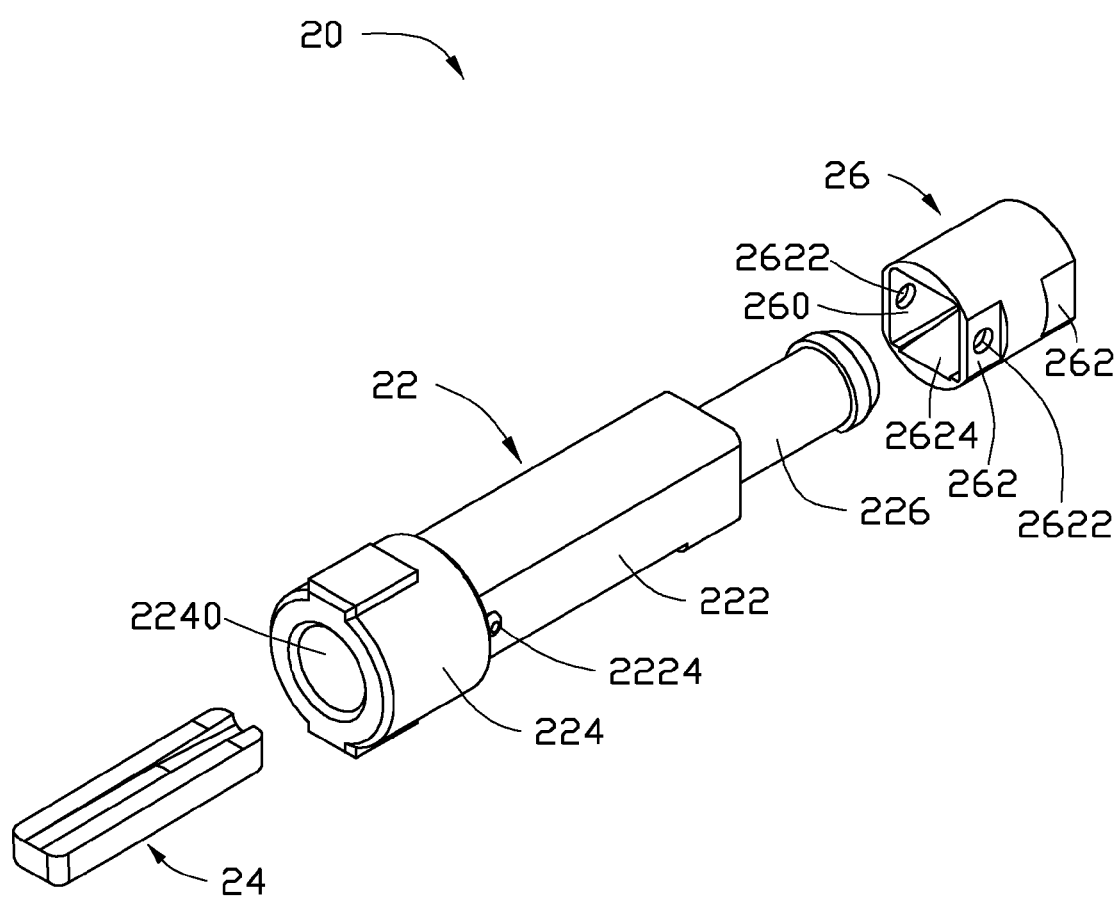
FIG. 3 is an exploded, isometric view of the fixing module of FIG. 2 including a fastening member.

Referring to FIGS. 2 and 3, the optical fiber ferrule 10 is substantially cylindrical, and is made of ceramic materials. The optical fiber ferrule 10 axially defines a through hole 102 (seen FIG. 6) for receiving the optical fiber 82. The optical ferrule 10 further defines a guiding hole 104 (seen FIG. 6) communicating with the through hole 102 in an end of the optical ferrule 10 for facilitating the insertion of the optical fiber 82 into the through hole 102. In the illustrated embodiment, a diameter of the through hole 102 is a little larger than a diameter of the optical fiber 82, to facilitate passing the optical fiber 82 through. When an end of the optical fiber 82 is resisted, the optical fiber 82 can be elastically bent in the through hole 102, which can hold the optical fiber 82 in place. The guiding hole 104 can be substantially funnel shaped with a smaller end of the guiding hole 104 communicating with the through hole 102, which can prevent the optical fiber 82 breaking when being bent at a distal end of the through hole 102.

Figure 4:
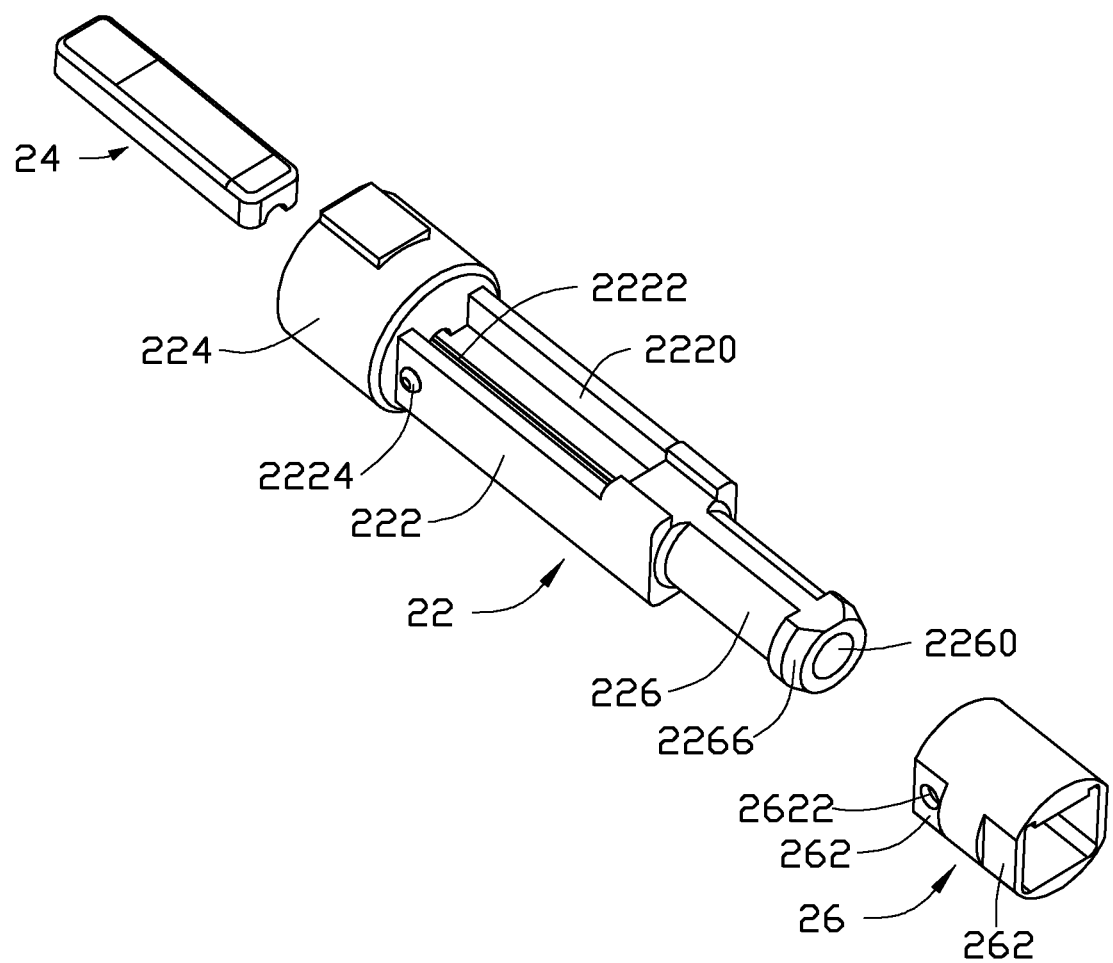
FIG. 4 is similar to FIG. 3, but viewed from another aspect.
Figure 5:
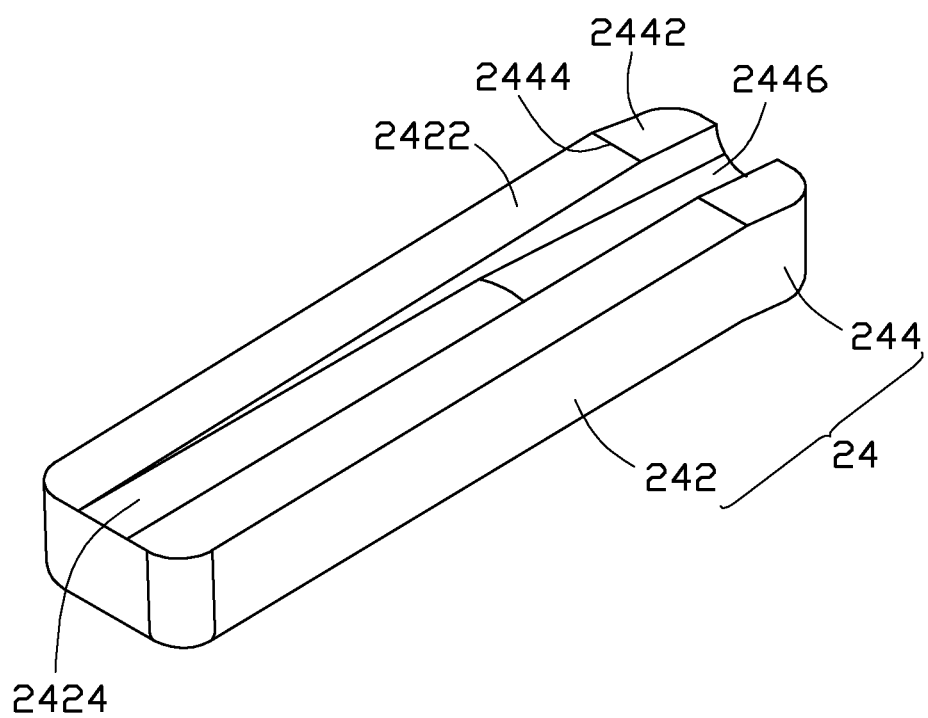
FIG. 5 is an enlarged, isometric view of the fastening member of FIG. 3.

FIGS. 3 to 5 show an embodiment of a fixing module 20. The fixing module 20 is a sleeve and includes a first end surface 20a and a second end surface 20b. The first end surface 20a and the second end surface 20b are positioned at opposite ends of the fixing module 20. The fixing module 20 defines a receiving room 20d. The fixing module 20 includes a support member 22, a fastening member 24 mating with the support member 22, and a locking member 26. The locking member 26 is sleeved on the support member 22 and the fastening member 24 for gripping the optical fiber 82.

The support member 22 is substantially cylindrical. The support member 22 includes a fixing portion 222, a first assembling portion 224, and a second assembling portion 226. The first assembling portion 224 and the second assembling portion 226 extend outward from opposite ends of the fixing portion 222. The second assembling portion 226 forms a latching portion 2266 protruding from the outer surface of the assembling portion 226 adjacent to an end of the second assembling portion 226 away from the fixing portion 222.

Figure 6:
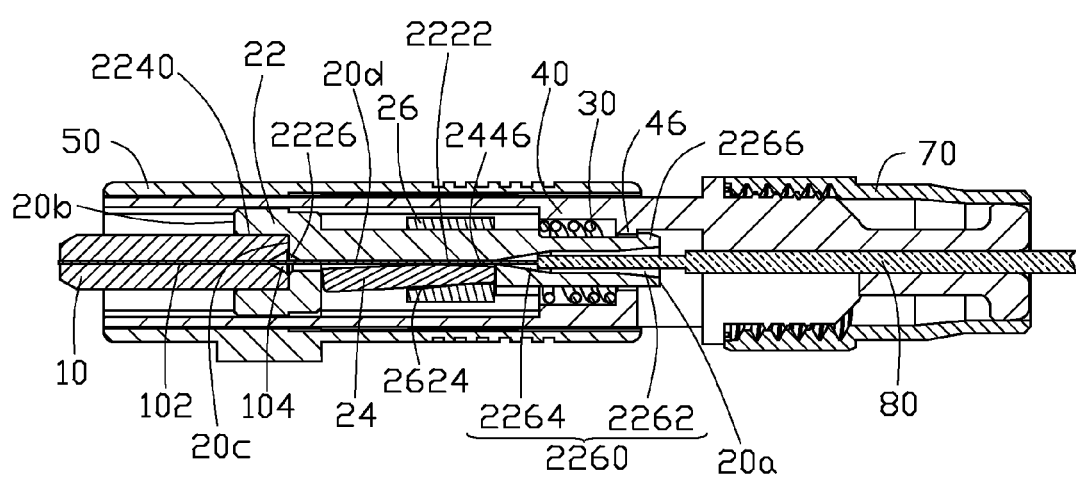
FIG. 6 is a cross-sectional view of the optical fiber connector of FIG. 1 taken along the line VI-VI, showing the fixing module at an ungripped state.

In the illustrated embodiment, a cross section of the fixing portion 222 is rectangular, and the fixing portion 222 defines a receiving portion 2220 for receiving the fastening member 24. The fixing portion 222 further defines a first restricting groove 2222 in the bottom of the receiving portion 2220 extending in a direction substantially parallel to an optical axis of the optical fiber connector 100. The first restricting groove 2222 is a V-shaped groove. The first restricting groove 2222 can also be an arc groove. The fixing portion 222 forms a pair of protrusions 2224 protruding from opposite sides of the fixing portion 222 adjacent to the first assembling portion 224. The protrusions 2224 are located at opposite sides of the receiving portion 2220. The first assembling portion 224 axially defines an assembling hole 2240 in the second end surface 20b communicating with the first restricting groove 2222. The second assembling portion 226 axially defines a receiving hole 2260 communicating with the first restricting groove 2222. Both a diameter of the assembling hole 2240 and a diameter of the receiving hole 2260 are larger than a width of the restricting groove 2222. Referring to FIG. 6, a guiding groove 2226 is defined in an inner surface of the first restricting groove 2222 adjacent to the assembling hole 2240. The receiving hole 2260 is a stepped hole. The receiving hole 2260 includes a first guiding hole 2262 at an end thereof away from the first restricting groove 2222 and a second guiding hole 2264 adjacent to and communicating with the first restricting groove 2222. A diameter of the second guiding hole 2264 is less than a diameter of the first guiding hole 2262. The guiding groove 2226, the first restricting groove 2222, and the receiving hole 2260 cooperatively form the receiving room 20d. The receiving room 20d extends from the first end surface 20a to a bottom surface 20c of the assembling hole 2240.

The fastening member 24 is received in the receiving portion 2220 of the supporting member 22, and mates with the supporting member 22 to fasten the optical fiber 82 of the cable 80. The fastening member 24 includes a first resisting portion 242 and a second resisting portion 244 slantingly connected with the first resisting portion 242. The first resisting portion 242 includes a first resisting surface 2422 facing the bottom of the receiving portion 2220. The second resisting portion 244 includes a second resisting surface 2442 facing the bottom of the receiving portion 2220. When the locking member 26 slides along the fixing portion 222, the first resisting surface 2422 and the second resisting surface 2442 are capable of resisting the bottom of the receiving portion 2220 alternately. The first resisting surface 2422 defines a second restricting groove 2424 corresponding to the first restricting groove 2222. The second resisting surface 2442 defines a guiding groove 2446 communicating with the second restricting groove 2424. The bottom of the guiding groove 2446 is a slanted surface, the guiding groove 2446 is deeper than the second restricting groove 2424, and the depth of the guiding groove 2446 gradually increases from the end adjacent to the second restricting groove 2424 to the other end. In the illustrated embodiment, the first resisting surface 2422 and the second resisting surface 2442 are both flat surfaces intersecting at an adjoining line 2444. In alternative embodiments, an arc surface is located between the first resisting surface 2422 and the second resisting surface 2442.

In an alternative embodiment, the second resisting surface 2424 can be omitted, and the optical fiber 82 fixed in the fixing module 20 by means of the first resisting surface 2422 resisting the optical fiber 82.

In an alternative embodiment, the guiding groove 2446 is formed at an end of the receiving portion 2220 adjacent to the second resisting surface 2442.

The locking member 26 is substantially a sleeve. The locking member 26 axially defines a through hole 260 mating with a cross section of the fixing portion 222 of the support member 22. The locking member 26 forms two pairs of gripping portions 262 at outer surfaces of the locking member 26. One pair of the gripping portions 262 define a pair of locking holes 2622 corresponding to the pair of protrusions 2224. A slanted surface 2624 is formed at an inner surface of the locking member 26 adjacent to an end of the locking member 26, the slanted surface 2624 is formed between the pair of locking holes 2622, and a diameter of the through hole 260 adjacent to the second assembling portion 226 is larger than a diameter of the through hole 260 away from the second assembling portion 226.

The elastic member 30 is a compression spring sleeved on the second assembling portion 226 in the embodiment. The inner housing 40 defines a pair of sliding grooves 42 in a sidewall thereof extending in a direction substantially parallel to the optical axis of the optical fiber connector 100. The inner housing 40 has an external thread 44 at an end thereof. The inner housing 40 further forms a locking portion 46 at an inner surface thereof corresponding to the latching portion 2266.

The outer housing 50 is shaped to facilitate to installation of the optical fiber connector 100 into an SC adapter (not shown) in the embodiment. In alternative embodiments, the outer housing 50 can be shaped to facilitate the installation of the optical fiber connector 100 to other types of adapters. The outer housing 50 defines a pair of operating grooves 52 communicating with the pair of sliding grooves 42 of the inner housing 40. The boot 70 forms an internal thread 72 corresponding to the external thread 44 of the inner housing 40. The boot 70 fastens on an end of the inner housing 40 over the external thread 44.

Figure 7:
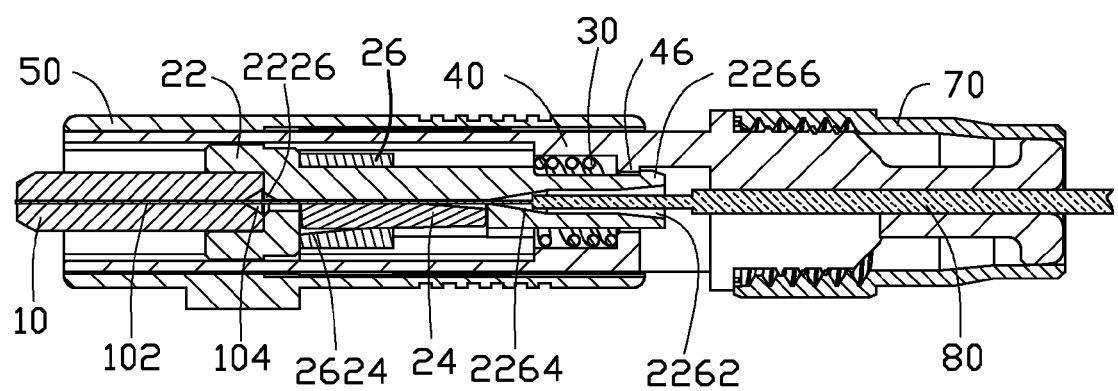
FIG. 7 is similar to FIG. 6, but showing the fixing module at a gripped state.

Referring to FIGS. 6 and 7, in assembly of the optical fiber connector 100, the fastening member 24 is received in the receiving portion 2220 of the support member 22. The locking member 26 is sleeved on an end of the support member 22 adjacent to the second assembling portion 226 (as seen in FIG. 6). The optical ferrule 10 is fastened in the assembling hole 2240 of the fixing module 20. The elastic member 30 is sleeved on the second assembling portion 226. The fixing module 20 is assembled in the inner housing 40 with the latching portion 2266 engaging with the locking portion 46. One end of the elastic member 30 resists the locking portion 46, and the other end of the elastic member 30 resists a distal end of the fixing portion 222. The outer housing 50 is sleeved on the inner housing 40 with the pair of operating grooves 52 communicating with the pair of sliding grooves 42. Finally, the boot 70 is fastened on a distal end of the inner housing 40 away from the outer housing 50.

Referring to FIGS. 1 to 7, in use of the optical fiber connector 100, the boot 70 is taken off from the inner housing 40, the optical fiber 82 of the cable 80 is inserted into the fixing module 20 from a distal end of the boot 70 away from the outer housing 50. In an initial state, the locking member 26 is located at an end of the fixing portion 222 adjacent to the second assembling portion 226, the second resisting surface 2442 resists against the bottom of the receiving portion 2220, and the first resisting surface 2422 is warped to form a gap (as seen in FIG. 6) between the first resisting surface 2422 and the bottom of the receiving portion 2220. The optical fiber 82 is inserted into the fixing module 20, and a length of the optical fiber 82 protruding out of the optical ferrule 10 is controlled to be in a range from about 2 μm to 4 μm. In the illustrated embodiment, the length of the optical fiber 82 protruding out of the optical ferrule 10 is 3 μm.

Figure 8:
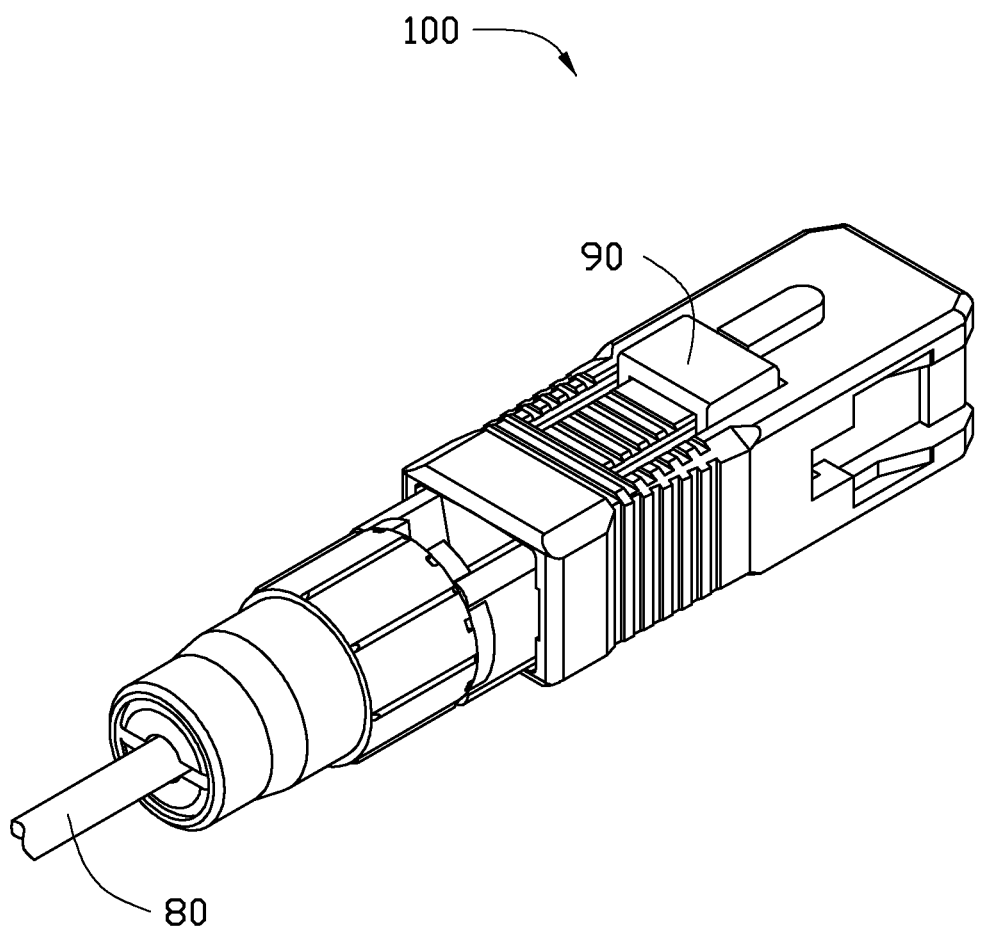
FIG. 8 is an assembled, isometric view of the optical fiber connector of FIG. 1 being clamped by an assembly tool.
Figure 9:
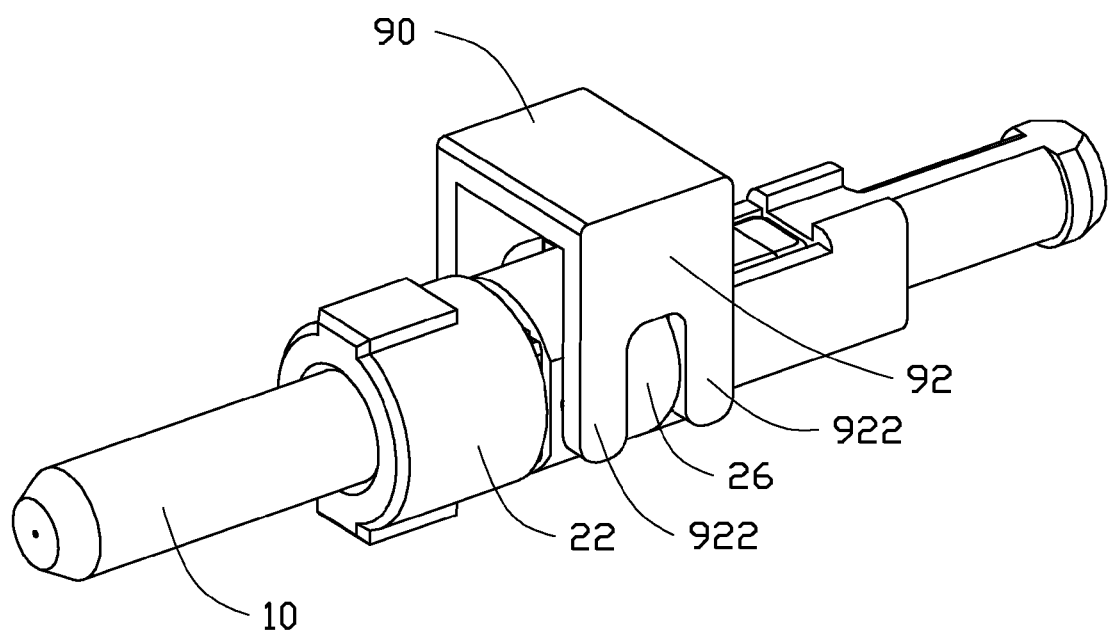
FIG. 9 is an isometric view of the fixing module of FIG. 2 being clamped by an assembly tool.

In order to slide the locking member 26, an assembling tool 90, as shown in FIGS. 8 and 9, is needed. The assembling tool 90 is substantially U-shaped and includes a pair of elastic arms 92. Each of the pair of elastic arms 92 includes a pair of elastic portions 922. In use, the pair of elastic arms 92 are passed through the pair of operating grooves 52 and the pair of sliding grooves 42 successively, and the elastic arms 92 latch with the two pairs of gripping portions 262. An operator slides the assembling tool 90 along the pair of operating grooves 52 to slide the locking member 26 towards an end of the fixing portion 222 adjacent to the first assembling portion 224 until the pair of locking holes 2622 engage with the pair of protrusions 2224. The first resisting surface 2422 resists the bottom of the receiving portion 2220 to fix in place the optical fiber 82 received in the first restricting groove 2222. The boot 70 is fastened on a distal end of the inner housing 40 to fasten on and secure the outer coating 86 of the cable 80.

The pair of locking holes 2622 engaging with the pair of protrusions 2224 prevent the locking member 26 from sliding. In an alternative embodiment, the pair of locking holes 2622 and the pair of protrusions 2224 can be omitted.

When the optical fiber 82 needs to be removed from the optical fiber connector 100, the locking member 26 is slid via the assembling tool 90 to its initial state and the boot 70 taken off. The assembling tool 90 should be taken off the optical fiber connector 100 when the optical fiber connector 100 is in a state of use, but the locking member 26 cannot be slid along the fixing module 20 without the assembling tool 90, which prevents the optical connector 100 from being knocked off by accident, and ensure the optical fiber is firmly fixed in the fixing module 20.

Figure 10:
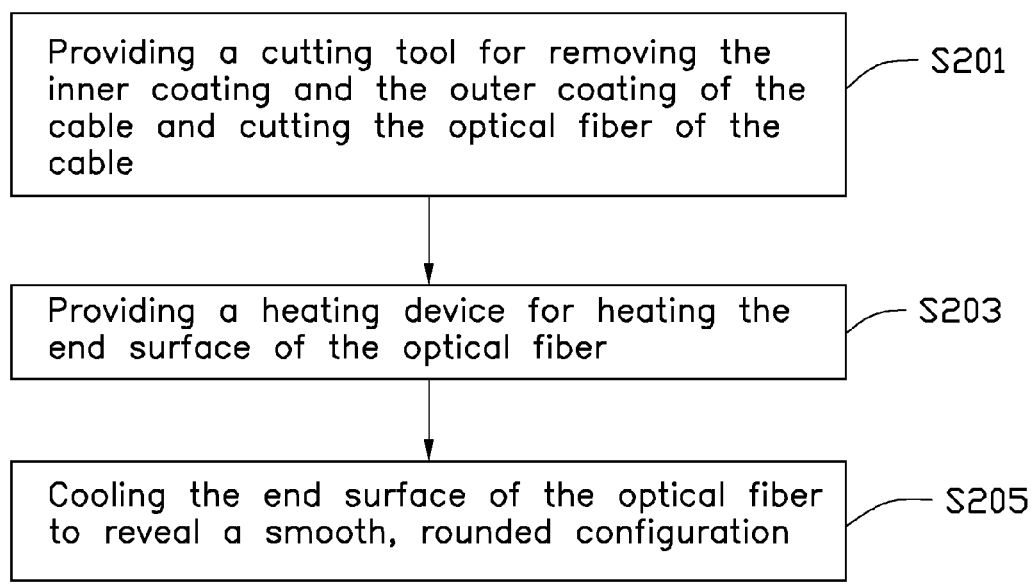
FIG. 10 is a flowchart of one embodiment of a method for treating an end surface of the optical fiber of a cable.

The optical fiber 82 may have a plurality of depressions, a plurality of cracks, a plurality of burrs, or a plurality of scratches at an end surface of the optical fiber 82 which has been cut, and any of these defects will increase a light loss and affect the efficiency of a data transmission of the optical connector 100. In order to increase the efficiency of the data transmission of the optical connector 100, FIG. 10 shows an embodiment of a method for treating the end surface of the optical fiber 82.

In step S201, a cutting tool is provided for removing the inner coating 84 and the outer coating 86 of a cable 80 and cutting the optical fiber 82 of the cable 80. In the illustrated embodiment, the inner coating 84 and the outer coating 86 are partially removed via the cutting tool to expose the optical fiber 82.

In step S203, a heating device is provided for heating the end surface of the optical fiber 82. In the illustrated embodiment, the heating device includes two electrodes. A high pressure electric arc will be generated between the two electrodes under a discharge voltage, to heat the end surface to an elevated temperature near the melting point of the fiber material. When all defects have disappeared or have been smoothed, the heating must be stopped.

In step S205, the end surface of the optical fiber 82 is cooled to reveal a smooth, rounded configuration.

Figure 11:
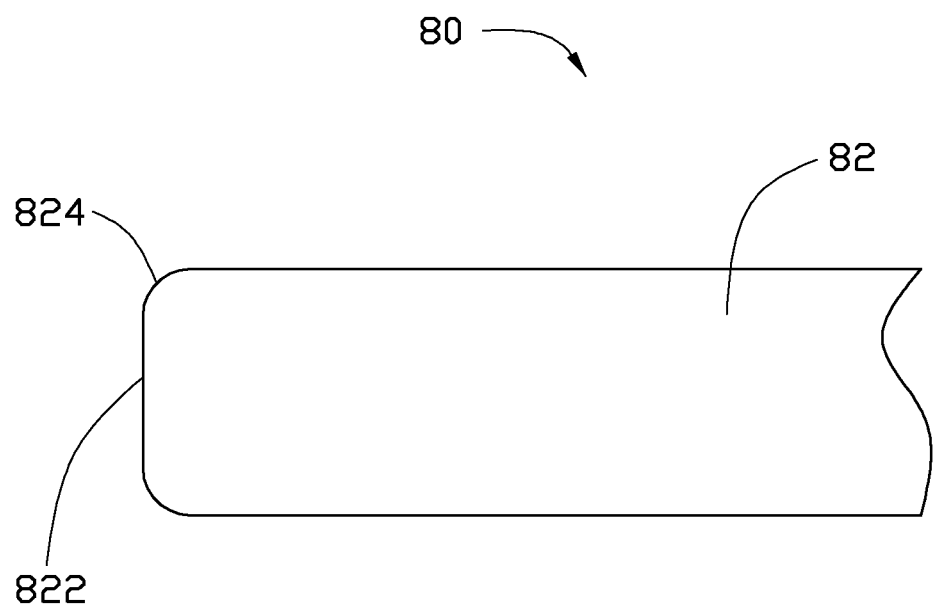
FIG. 11 is a partly enlarged view of the optical fiber of FIG. 2.

FIG. 11 shows an end surface of the optical fiber 82 after being treated by this method. The end surface of the optical fiber 82 includes a flat surface 822 at a center of the end surface and an arc surface 824 surrounding the flat surface 822.

In alternative embodiments, the configuration of the end surface of the optical fiber 82 can be changed according to the discharge voltage or discharge time to assume a different configuration of the end surface of the optical fiber 82 such as an arc configuration, a spherical configuration, or the like.

The optical fiber 82 is passed through the optical fiber connector 100 from a distal end of the boot 70 to a distal end of the optical ferrule 10 away from the boot 70, and the end surface of the optical fiber 82 protrudes out of a distal end of the optical ferrule 10. The optical connector 100 is different from a field installable connector with an optical fiber stub already terminated in the optical ferrule. The optical connector 100 avoids the need to join segments, which improves the quality of optical coupling and minimizes Fresnel losses.

The end surface of the optical fiber 82 is smoothed by the method, which increases the contact area between the optical fiber 82 and another optical fiber abutting the optical fiber 82. A length of the optical fiber 82 out of the optical ferrule 10 is controlled to be in a range from about 2 μm to 4 μm, when the optical connector 100 is assembled on an adapter (not shown) to join with another optical fiber connector (not shown), the end surface of the optical fiber 82 of the optical fiber connector 100 resists the end surface of the optical fiber of the other optical fiber connector, and the optical fiber 82 will be bent, which puts the two end surfaces in continuous contact with each other. In addition, the end surface of the optical fiber 82 will be enlarged after the end surface of the optical fiber 82 has been treated, and the diameter of the end surface of the optical fiber 82 is nearly the same as the diameter of the through hole 102. Resisting on the end surface of the optical fiber of the other optical fiber connector, the end surface of the optical fiber 82 will be firmly received in the through hole 102 of the optical ferrule 10.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. An optical fiber connector, comprising:
a fixing module comprising a first end surface and a second end surface opposite to the first end surface, the fixing module defining an assembling hole in the second end surface and a receiving room extending from the first end surface to a bottom surface of the assembling hole;
an optical fiber ferrule axially defining a through hole, the optical fiber ferrule fastened in the assembling hole with an end surface of the optical fiber ferrule contacting the bottom surface, the through hole and the receiving room located at opposite sides of the bottom surface, the through hole communicating with the receiving room; and
an optical fiber gripped in the fixing module, wherein an end surface of the optical fiber comprises an arc surface surrounding a periphery of the end surface of the optical fiber, and the optical fiber passes through the receiving room and is received in the through hole of the optical fiber ferrule.

2. The optical fiber connector of claim 1, wherein the end surface of the optical fiber further comprises a flat surface, and the arc surface surrounds the flat surface.

3. The optical fiber connector of claim 1, wherein the end surface of the optical fiber is an arc configuration.

4. The optical fiber connector of claim 1, wherein the end surface of the optical fiber is a spherical configuration.

5. The optical fiber connector of claim 1, wherein the optical fiber ferrule further defines a guiding hole communicating with the through hole in the end surface of the optical fiber ferrule for facilitating the optical fiber being inserted into the through hole.

6. The optical fiber connector of claim 1, wherein the fixing module comprises a support member, a fastening member mating with the support member, and a locking member, the locking member is sleeved on the support member and the fastening member for gripping the optical fiber.

7. The optical fiber connector of claim 6, wherein the support member comprises a fixing portion, and a first assembling portion and a second assembling portion extending from opposite ends of the fixing portion, the fixing portion defines a receiving portion, the fastening member comprises a first resisting portion and a second resisting portion slantingly connected with the first resisting portion, the first resisting portion comprises a first resisting surface facing the bottom of the receiving portion, the second resisting portion comprises a second resisting surface facing the bottom of the receiving portion, the fastening member is received in the receiving portion, the locking member is sleeved on the fixing portion, and the first resisting surface and the second resisting surface resists the bottom of the receiving portion alternately as the locking member slides along the fixing portion.

8. The optical fiber connector of claim 7, wherein the fixing portion defines a first restricting groove in the bottom of the receiving portion extending in a direction substantially parallel to the optical axis of the optical fiber connector, the first assembling portion axially defines the assembling hole communicating with the first restricting groove, the second assembling portion axially defines a receiving hole communicating with the first restricting groove, and both the diameter of the assembling hole and the diameter of the receiving hole are larger than the width of the first restricting groove.

9. The optical fiber connector of claim 8, wherein the first resisting surface defines a second restricting groove corresponding to the first restricting groove, the second resisting surface defines a guiding groove communicating with the second restricting groove, the bottom of the guiding groove is a slanted surface, the guiding groove is deeper than the second restricting groove, and the depth of the guiding groove is gradually deeper from one end thereof adjacent to the second restricting groove to the other end thereof away from the second restricting groove.

10. The optical fiber connector of claim 9, wherein the locking member axially defines a through hole mating with the cross section of the fixing portion of the support member, the locking member forms two pairs of gripping portions at the outer surface of the locking member.

11. The optical fiber connector of claim 10, wherein the fixing portion forms a pair of protrusions protruding out from opposite sides of the fixing portion adjacent to the first assembling portion, one pair of the gripping portions define a pair of locking holes for engaging with the pair of protrusions.

12. The optical fiber connector of claim 11, wherein the locking member further comprises a slanted surface formed at an inner surface of the locking member adjacent to an end of the locking member, the slanted surface is located between the pair of locking holes, and the diameter of the through hole adjacent to the second assembling portion is larger than the diameter of the through hole away from the second assembling portion.

13. The optical fiber connector of claim 7, wherein the second assembling portion forms a latching portion protruding out from the outer surface of the second assembling portion away from the fixing portion, the optical fiber connector further comprises an inner housing sleeved on the fixing module, and the inner housing forms a locking portion at an inner surface thereof latching with the latching portion.

14. The optical fiber connector of claim 13, wherein the inner housing defines a pair of sliding grooves in a sidewall thereof extending in a direction substantially parallel to the optical axis of the optical fiber connector.

15. The optical fiber connector of claim 14, further comprising an outer housing sleeved on the inner housing, wherein the outer housing defines a pair of operating grooves communicating with the pair of sliding groove of the inner housing.

16. The optical fiber connector of claim 13, further comprising an elastic member sleeved on the second assembling portion, wherein one end of the elastic member resists the locking portion, and the other end of the elastic member resists a distal end of the fixing portion.

17. The optical fiber connector of claim 13, wherein the inner housing forms an external thread at an end thereof, the optical fiber connector further comprises a boot, the boot forms an internal thread corresponding to the external thread of the inner housing, and the boot is fastened on an end of the inner housing via the external thread matching with the internal thread.

* * * * *